(12) United States Patent
Kailey et al.

(10) Patent No.: US 11,745,501 B1
(45) Date of Patent: Sep. 5, 2023

(54) DROP SIZE MONITORING MECHANISM

(71) Applicants: Walter F. Kailey, Boulder, CO (US); Mikel Stanich, Boulder, CO (US)

(72) Inventors: Walter F. Kailey, Boulder, CO (US); Mikel Stanich, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/669,804

(22) Filed: Feb. 11, 2022

(51) Int. Cl.
*B41J 2/045* (2006.01)
*H04N 1/52* (2006.01)
*B41J 29/393* (2006.01)

(52) U.S. Cl.
CPC ......... *B41J 2/04535* (2013.01); *B41J 2/0456* (2013.01); *H04N 1/52* (2013.01); *B41J 29/393* (2013.01)

(58) Field of Classification Search
CPC .... B41J 2/04535; B41J 2/0456; B41J 29/393; H04N 1/52
USPC .......................... 358/1.1, 1.15, 1.9
See application file for complete search history.

(56) References Cited

U.S. PATENT DOCUMENTS

| | | | |
|---|---|---|---|
| 6,554,388 B1 | 4/2003 | Wong et al. | |
| 7,296,882 B2 | 11/2007 | Korn et al. | |
| 7,423,778 B2 | 9/2008 | Hersch et al. | |
| 7,425,061 B2 | 9/2008 | Buehler et al. | |
| 8,100,057 B2 | 1/2012 | Hartmann et al. | |
| 8,576,450 B2 | 11/2013 | Shepherd et al. | |
| 8,734,034 B2 | 5/2014 | Morovic et al. | |
| 8,923,713 B2 | 12/2014 | Terao et al. | |
| 9,056,485 B2 | 6/2015 | Szafraniec | |
| 9,096,056 B2 | 8/2015 | Zhou et al. | |
| 9,102,157 B2 | 8/2015 | Prothon et al. | |
| 9,132,629 B2 | 9/2015 | Ward et al. | |
| 9,656,463 B1 | 5/2017 | Ernst et al. | |

(Continued)

FOREIGN PATENT DOCUMENTS

| | | |
|---|---|---|
| CN | 108031573 | 5/2018 |
| EP | 0454448 | 10/1991 |

(Continued)

OTHER PUBLICATIONS

Reis, N., Ainsley, C. & Derby, B. Ink-Jet Delivery of Particle Suspensions by Piezoelectric Droplet Ejectors. Journal of Applied Physics. May 1, 2005;97(9):094903.

(Continued)

*Primary Examiner* — Quang N Vo
(74) *Attorney, Agent, or Firm* — Jaffery Watson Mendonsa & Hamilton LLP

(57) ABSTRACT

A system is disclosed. The system includes at least one physical memory device to store drop size logic and one or more processors coupled with the at least one physical memory device to execute the drop size logic to receive first ink usage amount data for each of a plurality of color planes associated with a first halftone design and print job data, receive first ink drop size data for each of a plurality of color planes associated with the first halftone design, receive second ink drop count data for each of the plurality of color planes associated with a second halftone design and the print job data and determine second ink drop size data for each of the plurality of color planes based on the corresponding first ink usage amount data, the first ink drop size data and the second ink drop count data.

20 Claims, 11 Drawing Sheets

(56) References Cited

U.S. PATENT DOCUMENTS

| | | | |
|---|---|---|---|
| 9,785,873 | B2 | 10/2017 | Stanich et al. |
| 9,832,428 | B2 | 11/2017 | Hauf |
| 9,967,429 | B2 | 5/2018 | Nakano |
| 10,129,436 | B2 | 11/2018 | Kimura |
| 10,214,038 | B2 | 2/2019 | Klinger |
| 10,237,452 | B2 | 3/2019 | Rius Rossell et al. |
| 10,338,496 | B2 * | 7/2019 | Able .................. G03G 15/556 |
| 10,500,849 | B1 | 12/2019 | Ernst et al. |
| 10,643,115 | B1 | 5/2020 | Kailey |
| 10,723,133 | B2 | 7/2020 | Ferreri et al. |
| 10,902,304 | B1 | 1/2021 | Stanich et al. |
| 10,990,863 | B1 | 4/2021 | Stanich et al. |
| 11,072,166 | B2 | 7/2021 | Kailey et al. |
| 2002/0051151 | A1 | 5/2002 | Ohshima |
| 2003/0179410 | A1 | 9/2003 | Velde |
| 2007/0024649 | A1 | 2/2007 | Reinten |
| 2013/0101328 | A1 | 4/2013 | Morovic et al. |
| 2013/0335780 | A1 | 12/2013 | Asai |
| 2014/0210898 | A1 | 7/2014 | Mantell et al. |
| 2017/0259560 | A1 | 9/2017 | Sreenivasan et al. |
| 2018/0234582 | A1 | 8/2018 | Stanich et al. |
| 2019/0224966 | A1 | 7/2019 | Gracia Verdugo et al. |
| 2019/0268482 | A1 | 8/2019 | Stanich et al. |
| 2019/0270304 | A1 | 9/2019 | Stanich et al. |
| 2020/0012908 | A1 | 1/2020 | Miyazaki et al. |
| 2020/0108621 | A1 * | 4/2020 | Ferreri .................. B41J 2/17566 |

FOREIGN PATENT DOCUMENTS

| | | |
|---|---|---|
| EP | 2313272 | 4/2011 |
| JP | 5157578 | 3/2013 |
| JP | 2018174143 | 11/2018 |
| WO | 0202338 | 1/2002 |
| WO | 2018022077 | 2/2018 |

OTHER PUBLICATIONS

Dijksman, J. F., et al. Precision inkjet printing of polymer light emitting displays Journal of Materials Chemistry 17.6 (2007): 511-522.

Link, N., & Semiat, R. (2009). Ink drop motion in wide-format printers: I. Drop flow from Drop-On-Demand (DOD) printing heads. Chemical Engineering and Processing: Process Intensification, 48(1), 68-83.

Slavuj, R., Coppel, L. G., & Hardeberg, J. Y. (Feb. 2015). Effect of ink spreading and ink amount on the accuracy of the Yule-Nielsen modified spectral Neugebauer model. In Color Imaging XX: Displaying, Processing, Hardcopy, and Applications (vol. 9395, p. 93950E). International Society for Optics and Photonics.

Rius, M., Casaldàliga, M., Vargas, X. F., Quintero, X., Segura, R., & del Vallàs, S. C. (Jan. 2015). Printer Calibrations for HP Large Format Page Wide Technology. In NIP & Digital Fabrication Conference (vol. 2015, No. 1, pp. 326-331). Society for Imaging Science and Technology.

Milder, O. B., Tarasov, D. A., & Titova, M. Y. (Mar. 2017). Inkjet printers linearization using 3D gradation curves. In CEUR Workshop Proceedings, Proceedings of the 1st International Workshop on Radio Electronics & Information Technologies (REIT 2017), Yekaterinburg, Russia (vol. 1814, pp. 74-83).

Jangra, A., Verma, S. & Boora, S. (2017). Identifying the Relationship Between Solid Ink Density and Dot Gain in Digital Printing. International Research Journal of Management Science & Technology, 8(3), 15-20. doi:10.32804/IRJMST. See highlighted and underlined sections.

Alamán, J. et al. (Nov. 2016). Inkjet Printing of Functional Materials for Optical and Photonic Applications. Materials 2016, 9(910). doi:10.3390/ma9110910. See highlighted and underlined sections.

U.S. Appl. No. 17/126,659 entitled Ink Usage Estimation for Each Drop Size Based on Histogram and Calibrated Drop Fraction, filed Dec. 18, 2020, 50 pages.

Office Action for U.S. Appl. No. 17/693,570, dated May 10, 2023, 6 pages.

* cited by examiner

DROP SIZE MONITORING MECHANISM

FIELD OF THE INVENTION

The invention relates to the field of image reproduction, and in particular, to performing ink drop size estimation for a printing system.

BACKGROUND

In commercial and transactional printers, it is common to estimate ink usage to determine one of the major components of the cost to print a job with an ink jet printer. Currently, ink estimation methods may be implemented to estimate an amount of ink used to print a job (e.g., ink usage) without needing to print the job. This estimation typically uses ink drop sizes, along with the number of drops associated with each different ink drop size for the job.

Additionally, ink monitoring (e.g., ink usage monitoring) during print job production enables determining the amount of ink used to print the print job. However, during printing of a print job the halftone calibration must typically be adjusted to maintain a factory-set response for the printer used to print the job data. As a result, the ink drop sizes may change. If the ink drop sizes used in determining the ink usage are not correct, the accuracy of the ink monitoring is negatively impacted.

Accordingly, a mechanism to monitor ink drop sizes is desired.

SUMMARY

In one embodiment, a system is disclosed. The system includes at least one physical memory device to store drop size logic and one or more processors coupled with the at least one physical memory device to execute the drop size logic to receive first ink usage amount data for each of a plurality of color planes associated with a first halftone design and print job data, receive first ink drop size data for each of a plurality of color planes associated with the first halftone design, receive second ink drop count data for each of the plurality of color planes associated with a second halftone design and the print job data to determine second ink drop size data for each of the plurality of color planes based on the corresponding first ink usage amount data, the first ink drop size data and the second ink drop count data.

BRIEF DESCRIPTION OF THE DRAWINGS

A better understanding of the present invention can be obtained from the following detailed description in conjunction with the following drawings, in which.

DETAILED DESCRIPTION

An ink drop size monitoring mechanism is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
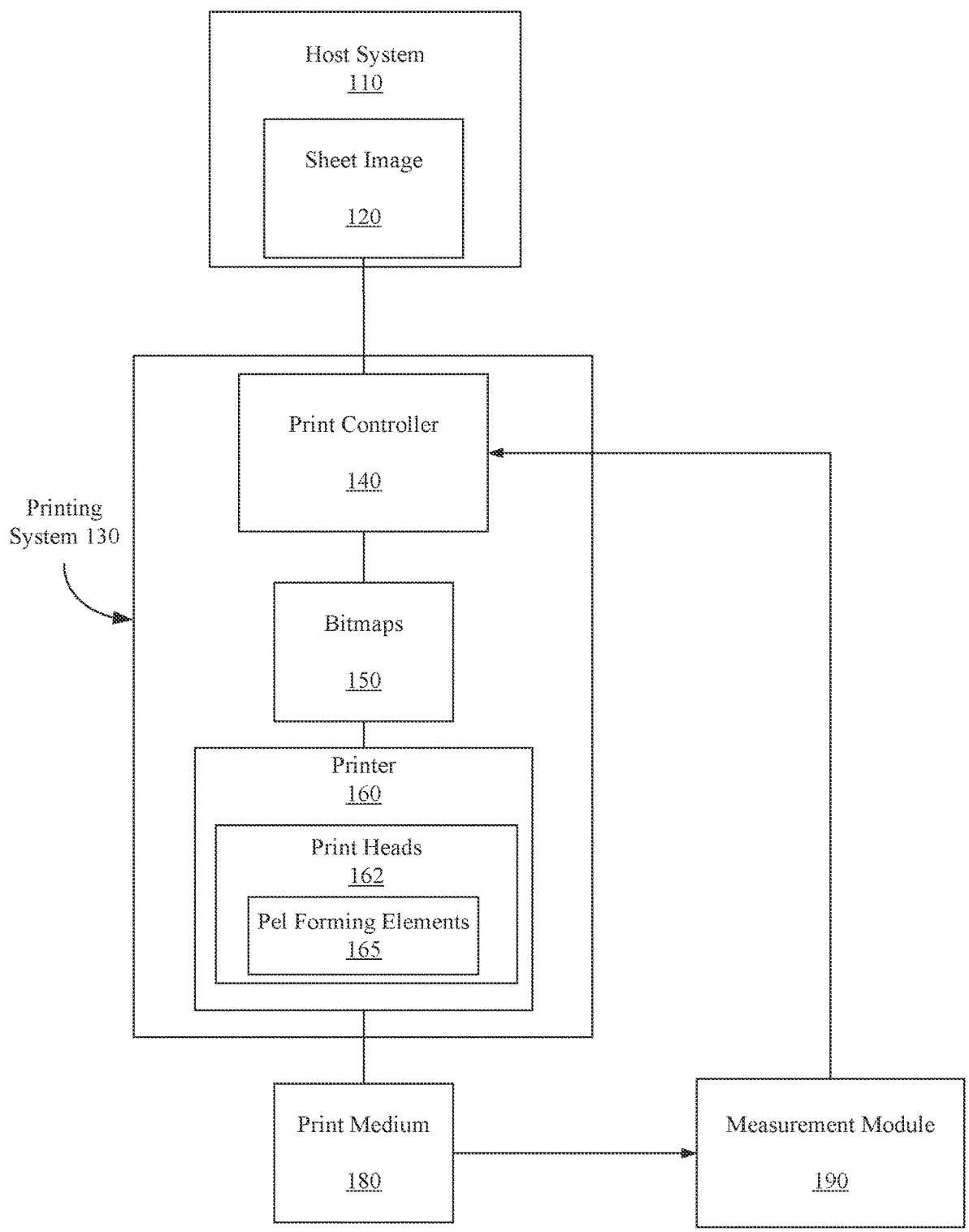
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 via a printer 160 (e.g., print engine). Print medium 180 may include paper, card stock, paper board, corrugated fiberboard, film, plastic, synthetic, textile, glass, composite or any other tangible medium suitable for printing. The format of print medium 180 may be continuous form or cut sheet or any other format suitable for printing. Printer 160 may be an ink jet, or another suitable printer type.

In one embodiment, printer 160 comprises one or more print heads 162, each including one or more pel forming elements 165 that directly or indirectly (e.g., by transfer of marking material through an intermediary) forms the representation of picture elements (pels) on the print medium 180 with marking material applied to the print medium. In an ink jet printer, the pel forming element 165 is a tangible device that ejects the ink onto the print medium 180 (e.g., an ink jet nozzle).

According to one embodiment, pel forming elements may be grouped onto one or more printheads (e.g., printhead arrays). The pel forming elements 165 may be stationary (e.g., as part of a stationary printhead) or moving (e.g., as part of a printhead that moves across the print medium 180) as a matter of design choice. In a further embodiment, pel forming elements 165 may be assigned to one of one or more color planes that correspond to types of marking materials (e.g., Cyan, Magenta, Yellow, and blacK (CMYK)). These types of marking materials may be referred to as primary colors.

Printer 160 may be a multi-pass printer (e.g., dual pass, 3 pass, 4 pass, etc.) wherein multiple sets of pel forming elements 165 print the same region of the print image on the print medium 180. In such an embodiment, the set of pel forming elements 165 may be located on the same physical structure (e.g., an array of nozzles on an ink jet print head) or separate physical structures. The resulting print medium 180 may be printed in color and/or in any of a number of gray shades, including black and white (e.g., Cyan, Magenta, Yellow, and blacK, (CMYK) and secondary colors (e.g., Red, Green and Blue), obtained using a combination of two primary colors). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for transmission. Bitmap 150 may be a halftoned bitmap (e.g., a compensated halftone bit map generated from compensated halftones, or un-compensated halftone bit map generated from un-compensated halftones) for printing to the print medium 180. The printing system 130 may be a high-speed printer operable to print relatively high volumes (e.g., greater than 100 pages per minute).

The print medium 180 may be continuous form paper, cut sheet paper, and/or any other tangible medium suitable for printing. The printing system 130, in one generalized form, includes the printer 160 that presents the bitmap 150 onto the print medium 180 (e.g., via ink, etc.) based on the sheet image 120. Although shown as a component of printing system 130, other embodiments may feature printer 160 as an independent device communicably coupled to print controller 140.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities. In one embodiment, measurement module 190 is implemented as part of a measurement system to obtain measurements of the printed medium 180. The measured results are communicated to print controller 140 to be used in a compensation process (e.g., halftone calibration, uniformity, etc.). The measurement system may be a stand-alone process or be integrated into the printing system 130.

According to one embodiment, measurement module 190 may include a sensor to take optical measurements of printed images on print medium 180. Measurement module 190 may generate and transmit measurement data. Measurement data may be OD (e.g., optical density), perceptual lightness (e.g., L* in the CIELAB color space L*a*b*) and/or scanned image (e.g., RGB) data corresponding to a printed image. In one embodiment, measurement module 190 may comprise one or more sensors that individually or in total take measurements for printed markings produced for some or all pel forming elements 165. In another embodiment, measurement module 190 may be a camera system, in-line scanner, densitometer or spectrophotometer.

In a further embodiment, measurement data may include map information to correlate portions of the measurement data (e.g., OD data) to the corresponding pel forming elements 165 that contributed to the portions of the measurement data. In another embodiment, the print instructions for a test pattern (e.g., step chart) provides the correlation of the portions of the measurement data to the corresponding pel forming elements that contributed to the portions of the measurement data.

Figure 2A:
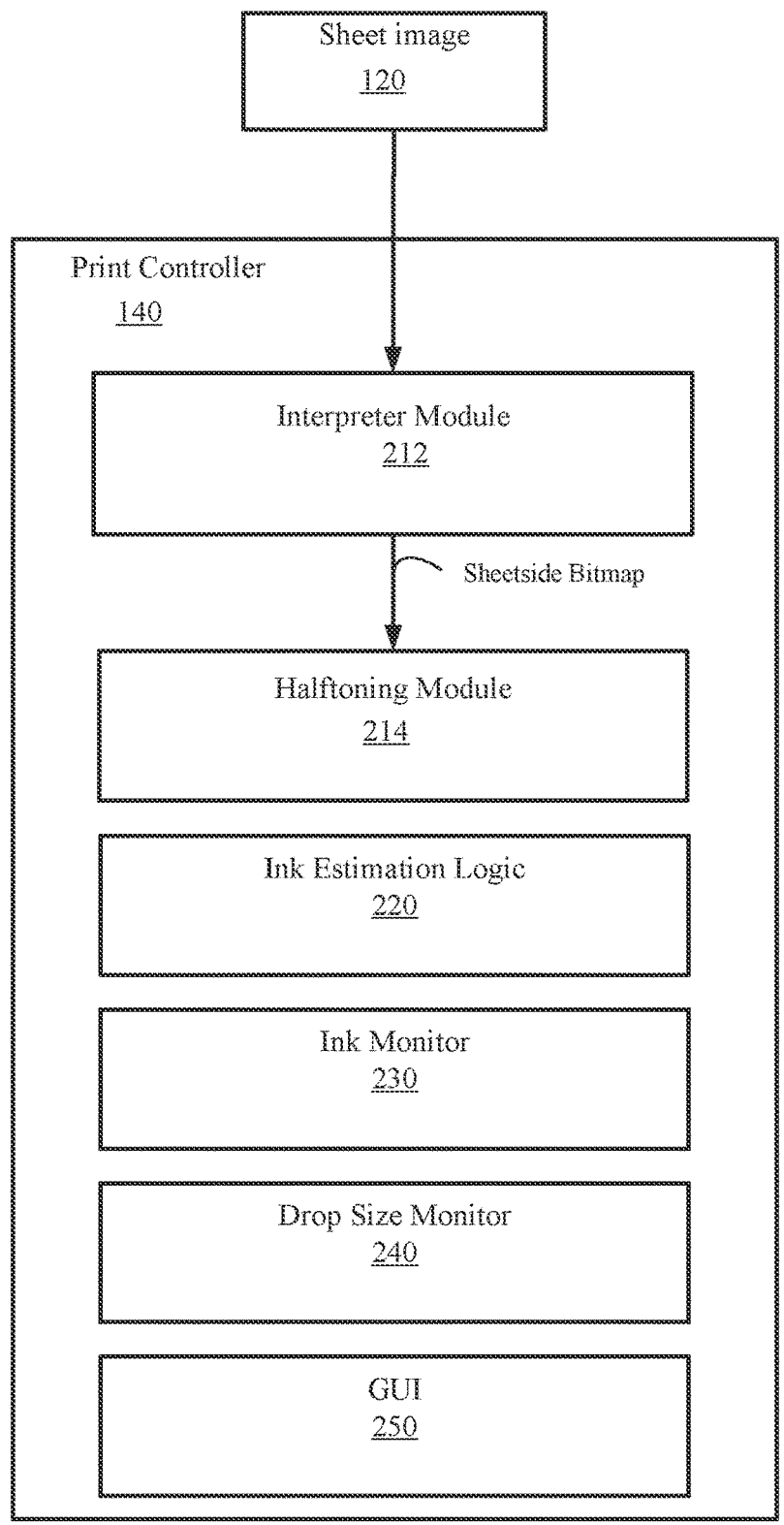
FIGS. 2A & 2B are block diagrams illustrating embodiment of a print controller.
Figure 2B:
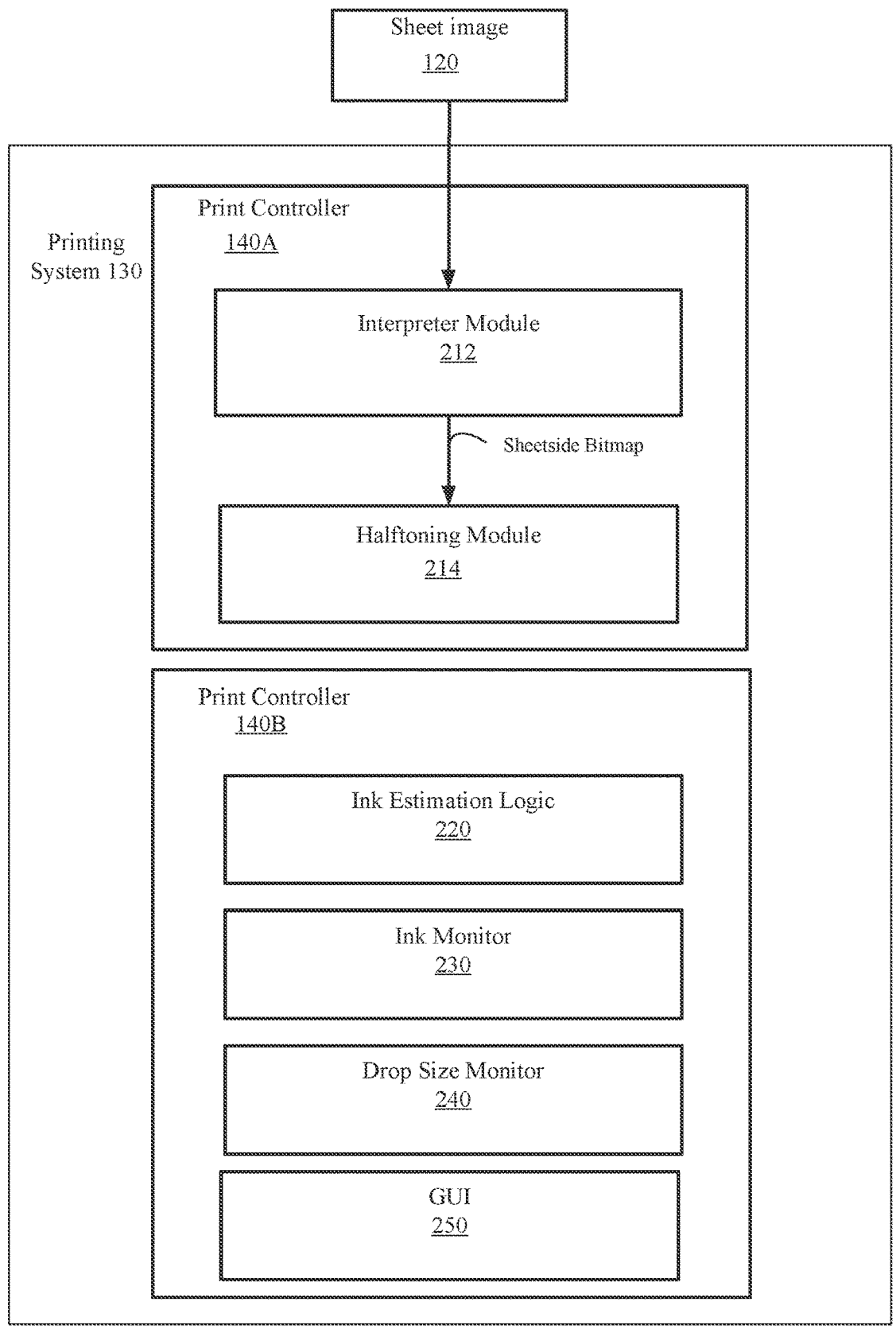

FIGS. 2A & 2B illustrate embodiments implementing print controllers 140. FIG. 2A illustrates a print controller 140 (e.g., DFE or digital front end), in its generalized form, including interpreter module 212, halftoning module 214, ink estimation logic 220, ink monitor 230 and drop size monitor 240, while FIG. 2B illustrates an embodiment having print controllers 140A & 140B. In this embodiment, print controller 140A includes interpreter module 212 and halftoning module 214, and print controller 140B includes ink estimation logic 220, ink monitor 230 and drop size monitor 240. Print controllers 140A and 140B may be implemented in the same printing system 130 (as shown) or may be implemented separately.

The interpreter module 212 is operable to interpret, render, rasterize, or otherwise convert images (e.g., raw sheet-side images such as sheet image 120) of a print job into sheetside bitmaps. The sheetside bitmaps generated by the interpreter module 212 for each primary color are each a 2-dimensional array of pels representing an image of the print job (e.g., a Continuous Tone Image (CTI)), also referred to as full sheetside bitmaps. The 2-dimensional pel arrays are considered "full" sheetside bitmaps because the bitmaps include the entire set of pels for the image. The interpreter module 212 is operable to interpret or render multiple raw sheetsides concurrently so that the rate of rendering substantially matches the rate of imaging of production print engines. In one embodiment, transfer functions may be implemented by print controller 140 and applied directly to image data as a part of the image processing prior to printing. In that case, the contone image data (CTI) is transformed by the transfer functions prior to halftoning.

Halftoning module 214 is operable to represent the sheet-side bitmaps as halftone patterns of ink. For example, halftoning module 214 may convert the pels (also known as pixels) to halftone patterns of CMYK ink for application to the paper. A halftone design may comprise a pre-defined mapping of input pel gray levels to output drop sizes (e.g., instructed ink drop sizes transmitted to printheads) based on pel location.

In one embodiment, the halftone design may include a finite set of transition thresholds between a finite collection of successively larger drop sizes, beginning with zero and ending with a maximum drop size. The halftone design may be implemented as threshold arrays (e.g., halftone threshold arrays) such as single bit threshold arrays or multibit threshold arrays. In another embodiment, the halftone design may be implemented as a three-dimensional look-up table with all included gray level values.

In a further embodiment, halftoning module 214 performs the multi-bit halftoning using the halftone design including a set of threshold values for each pel in the sheetside bitmap, where there is one threshold for each non-zero ink drop size. The pel is halftoned with the drop size corresponding to threshold values for that pel. The set of thresholds for a halftone design is referred to as a multi-bit threshold array (MTA).

Multi-bit halftoning is a halftone screening operation in which the final result is a selection of a specific drop size available from an entire set of drop sizes that the print engine is capable of employing for printing. Drop size selection based on the contone value of a single pel is referred to as "Point Operation" halftoning. The drop size selection is based on the contone levels for each pel in the sheetside bitmap. This contrasts with "Neighborhood Operation" halftoning, where multiple pels in the vicinity of the pel being printed are used to determine the drop size. Examples of neighborhood operation halftoning include the well-known error diffusion method.

Multi-bit halftoning is an extension of binary halftoning, where binary halftoning may use a single threshold array combined with a logical operation to decide if a drop is printed based on the contone level for a pel. Binary halftoning uses one non-zero drop size plus a zero-drop size (e.g., a drop size of none where no ink is ejected). Multi-bit halftoning extends the binary threshold array concept to more than one non-zero drop size.

Multi-bit halftoning may use multiple threshold arrays (e.g., multi-bit threshold arrays), one threshold array for each non-zero drop size. The point operation logic is also extended to a set of greater than and less than or equal to operations to determine the drop size by comparing the threshold and image contone data for each pel. Multi-bit defines a power of two set of drop sizes (e.g., two-bit halftone designs have four total drops, including a zero-drop size). While power of two may be employed to define the number of drops, systems not following this such as a three total drop system may be used and are still considered multi-bit.

For multi-bit halftones, the MTA is a three-dimensional array including one two-dimensional array for each drop size (e.g., instructed ink drop size) transition. Thus, an MTA includes a set of two-dimensional arrays of thresholds for transition between drop sizes: a first plane (or plane 1) provides the threshold for the Large output level, while a second plane (or plane 2) and third plane (or plane 3) provide thresholds for the Medium and Small output levels respectively for a system having three drop sizes, not including zero drop size (none or Off).

To use these threshold arrays for halftoning, each multibit threshold array is tiled across contone image data provided by the sheetside bitmap, which provides a set of threshold values for each pixel in the sheetmap. The contone image data (e.g., gray level data) is logically compared to the threshold data on a pixel basis. In the case of Large drops, they are produced by the halftoning when the image contone data is greater than the respective large threshold values in plane 1.

Medium drops are produced when the image contone data is greater than the medium drop plane 2 thresholds and also the image contone data is less than or equal to the large drop thresholds in plane 1. Small drops are produced when the image contone data is greater than the small drop thresholds in plane 3 and also the image contone data is less than or equal to the medium drop thresholds in plane 2.

Finally, the off/none drop size occurs for cases when the contone image data is less than or equal to the small drop thresholds in plane 3. In this embodiment of a two-bit multibit printing system, this set of four logical equations, used with thresholds from each plane of the multibit threshold array permit each printing drop size to be defined based on the contone values.

In other embodiments, the number of planes of threshold data can be extended to handle any number of drop sizes. The data of these two-dimensional arrays may be segmented into separate memory regions and stored in any convenient order. For example, the thresholds for each drop size transition may be stored contiguously in memory, and it is often advantageous to do so.

Ink estimation logic 220 is implemented to provide an estimation of the amount of ink (e.g., ink usage) that is to be used to produce a print job (or each page of the print job). In such an embodiment, ink estimation logic 220 may use sheetside bitmaps generated for each color plane (e.g., CMYK) corresponding to a processed print job and original halftones (e.g., MTAs) for each color plane to estimate the print job ink usage for each color plane. Although shown as being implemented in print controller 140, other embodiments may feature ink estimation logic 220 being implemented in any type of computing devices, such as host system 110.

Figure 3:
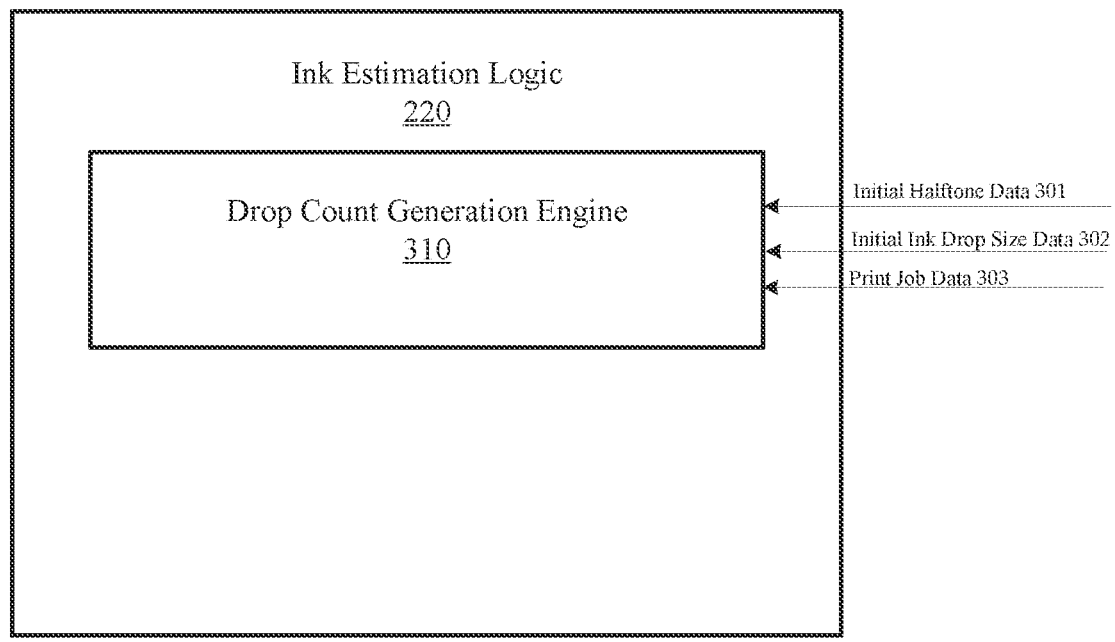
FIG. 3 illustrates one embodiment ink estimation logic.

FIG. 3 illustrates one embodiment of an ink estimation logic 220, as shown in FIG. 3, includes a drop count generation engine 310 that is implemented to generate the estimated ink usage amount data. In one embodiment, drop count generation engine 310 receives initial halftone data 301 (which represents the halftone design), as well as initial ink drop size data 302 which represent the quantitative ink drop amounts corresponding to each instructed ink drop size. Upon receiving print job data 303, drop count generation engine 310 uses the initial halftone data 301, initial ink drop size data 302 and print job data 303 to generate the ink usage amount data for a print job. In such an embodiment, drop count generation engine 310 generates the estimated ink usage amount data by processing the print job data 303 (e.g., by generating the sheetside bitmaps via interpreter module 212 and halftoning module 214) with the initial halftone data 301 to count the number of drops of each instructed size (e.g., Small, Medium or Large), multiplying the number of drops of each instructed size by the respective initial ink drop size data 302, and adding up to obtain the estimated ink usage amount data for the print job. In embodiments, ink drop size data and/or ink usage amount data may comprise a volume or a mass expressed in quantities of standardized units (e.g., metric system units such as grams or liters).

Ink estimation logic 220 generates estimated ink usage amount data which represents the estimated ink usage amount or total estimated ink usage amount used by a printer to print a print job. In one embodiment, ink estimation logic 220 generates first ink usage amount data (e.g., estimated ink usage amount data) based on the print job data, first halftone data (e.g., initial halftone data, uncalibrated halftone data, or original halftone data) and first ink drop size data (e.g., initial ink drop size data, original ink drop size data or factory ink drop size data) for each of a plurality of color planes. In another embodiment, ink estimation logic 220 generates first ink drop count data (e.g., estimated ink drop count data) based on the print job data and first halftone data and generates first ink usage amount data based on first estimated ink drop count data and first ink drop size data for each of a plurality of color planes.

According to one embodiment, the estimated ink drop count data comprises an estimated ink drop count matrix) ($Z^0$) and initial ink drop size vector($v^0$)(note that this may alternatively be called a matrix), as represented by:

$$Z^0 = \begin{bmatrix} z^0_{0,0} & \cdots & z^0_{0,D-1} \\ \vdots & \ddots & \vdots \\ z^0_{P-1,0} & \cdots & z^0_{P-1,D-1} \end{bmatrix}; \text{ and } v^0 = \begin{bmatrix} v^0_0 \\ \vdots \\ v^0_{D-1} \end{bmatrix},$$

As shown above, the estimated drop count matrix is comprised of a set of $Z^0_{p,d}$ matrix elements, each corresponding to a different page (p) within the print job and instructed ink drop size (d). In one embodiment, each element has, index p associated with a different page in the print job data and index d associated with a different instructed ink drop size. However, in other embodiments, index (p may be associated with a set of pel forming elements or a print head.

In still other embodiments, index (p) may be associated with one or more region of interest (e.g., print job, page, printhead, printhead array and/or portions of a printhead).

Index p ranges from zero to P−1, where P is the total number of regions of interest. Index d ranges from zero to D−1, where D is the total number of instructed ink drop sizes, not including the ink drop size none. The ink drop size column vector $v_0$ comprises ink amount values (e.g., $v_0$–$v_{D-1}$) associated with each of the plurality of instructed ink drop sizes in the initial drop size matrix. In a further embodiment, the drop amounts $v_0$–$v_{D-1}$ are known (e.g., experimentally pre-determined).

Figure 4:
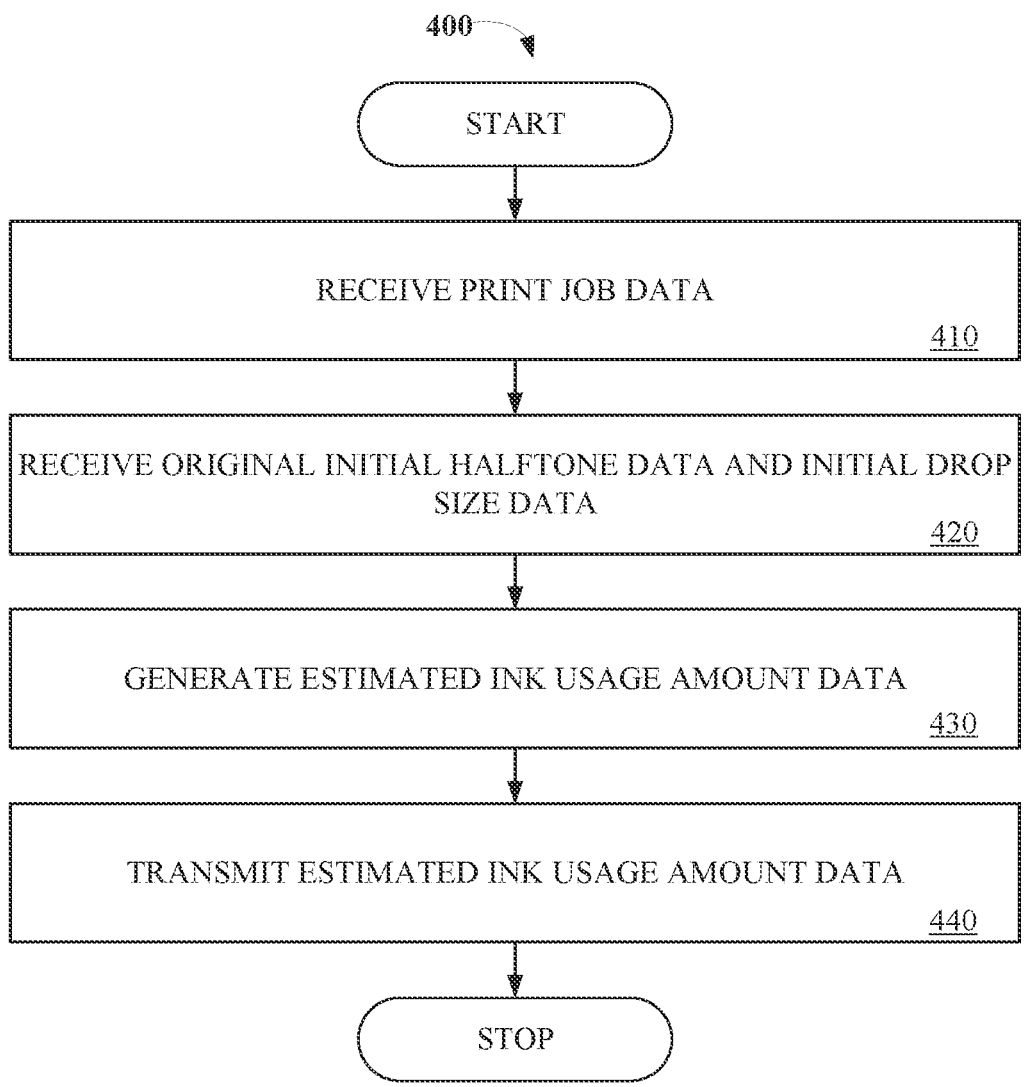
FIG. 4 is a flow diagram illustrating one embodiment for performing an ink estimation process.

FIG. 4 is a flow diagram illustrating one embodiment of a process 400 for performing an ink estimation. Process 400 may be performed by processing logic that may include hardware (e.g., circuitry, dedicated logic, programmable logic, microcode, etc.), software such as instructions run on a processing device, or a combination thereof. In one embodiment, process 400 is performed by ink estimation logic 220.

At processing block 410, print job data is received. At processing block 420, the initial halftone design and initial ink drop size data are received. At processing block 430, the estimated ink usage amount data is generated based on the original halftone design, initial ink drop size data, and print job data. At processing block 440, the estimated ink usage amount data is transmitted (e.g., to drop size monitor 240).

Figure 5:
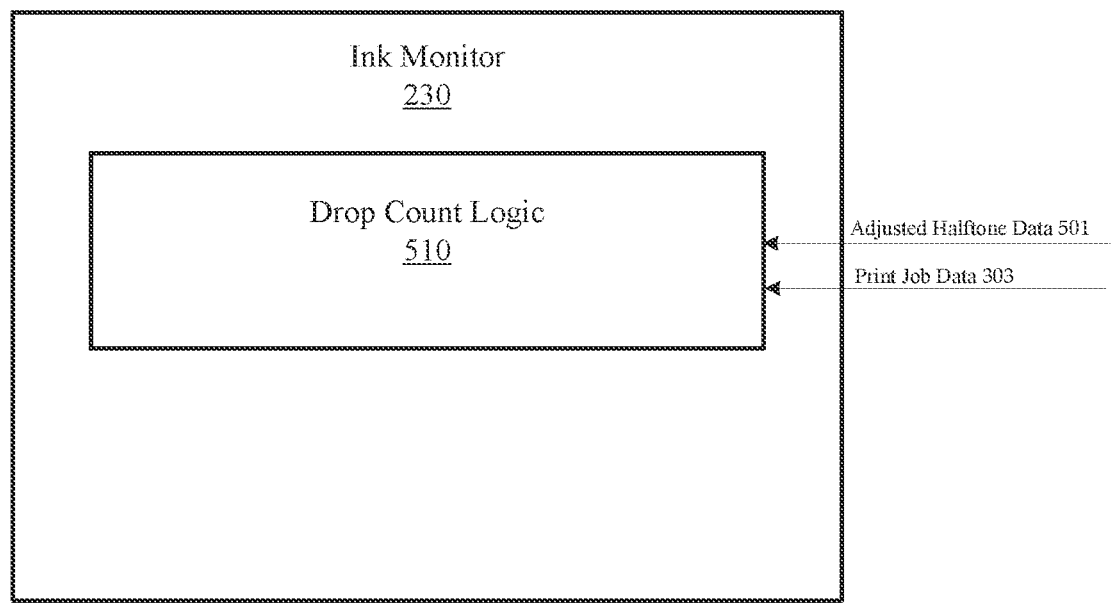
FIG. 5 illustrates one embodiment of an ink monitor.

Referring back to FIGS. 2A & 2B, ink monitor 230 is implemented to generate monitored ink drop count data. FIG. 5 illustrates one embodiment of an ink monitor 230 including drop count logic 510. Drop count logic 510 counts the number of drops of each size that are printed (e.g., on each page, by each print head, or other regions of interest) using an adjusted (e.g., compensated) halftone design represented by adjusted halftone data (e.g., second halftone data or compensated halftone data). In one embodiment, halftone thresholds are adjusted to restore a factory-set response as printer 160 is used to print the print job data. For example, a linear optical density (OD) response may be maintained for a constant ink deposition value for each individual color. Thus, the original halftone for each color is adjusted to generate the adjusted halftone design that is used to generate the monitored ink drop count data (e.g., second ink drop count data).

According to one embodiment, the monitored ink drop count data comprises monitored ink drop count matrix (Z). The monitored ink drop size is vector (v) and is to be determined. (Z) and (v) are represented by:

$$Z = \begin{bmatrix} z_{0,0}^0 & \cdots & z_{0,D-1}^0 \\ \vdots & \ddots & \vdots \\ z_{P-1,0}^0 & \cdots & z_{P-1,D-1}^0 \end{bmatrix}; \text{ and } v = \begin{bmatrix} v_0 \\ \vdots \\ v_{D-1} \end{bmatrix},$$

Similar to the discussion above with reference to the estimated ink drop count data, the monitored drop count matrix is comprised of a set of $Z_{p,d}$ elements, each corresponding to a different region of interest within the job (p) and instructed ink drop size (d). In one embodiment, index p is associated with a different page in the print job data and index d with a different instructed ink drop size. Index p ranges from zero to P−1. Where P is the total number of regions of interest (e.g., pages in a job). Index d ranges from zero to D−1. Where D is the total number of instructed ink drop sizes, not including the none drop size. Similar to the discussion above with reference to the initial ink drop size data, the monitored ink drop size column vector, v comprises unknown ink drop size values (e.g., $v_0$–$v_{D-1}$) associated with each of the plurality of drop sizes in the monitored drop size matrix. Therefore, each individual new estimate for the unknown drop size vector elements will have a corresponding value in the original drop size column vector. The vector of new drop sizes v reflects the impact of the recalibration that was performed to achieve the same calibrated printer response that was used initially. The pages (e.g., one or more region of interest) in the ink monitor drop count matrix are assumed to be the same pages (e.g., region of interest) in the ink estimator drop count matrix.

Figure 6:
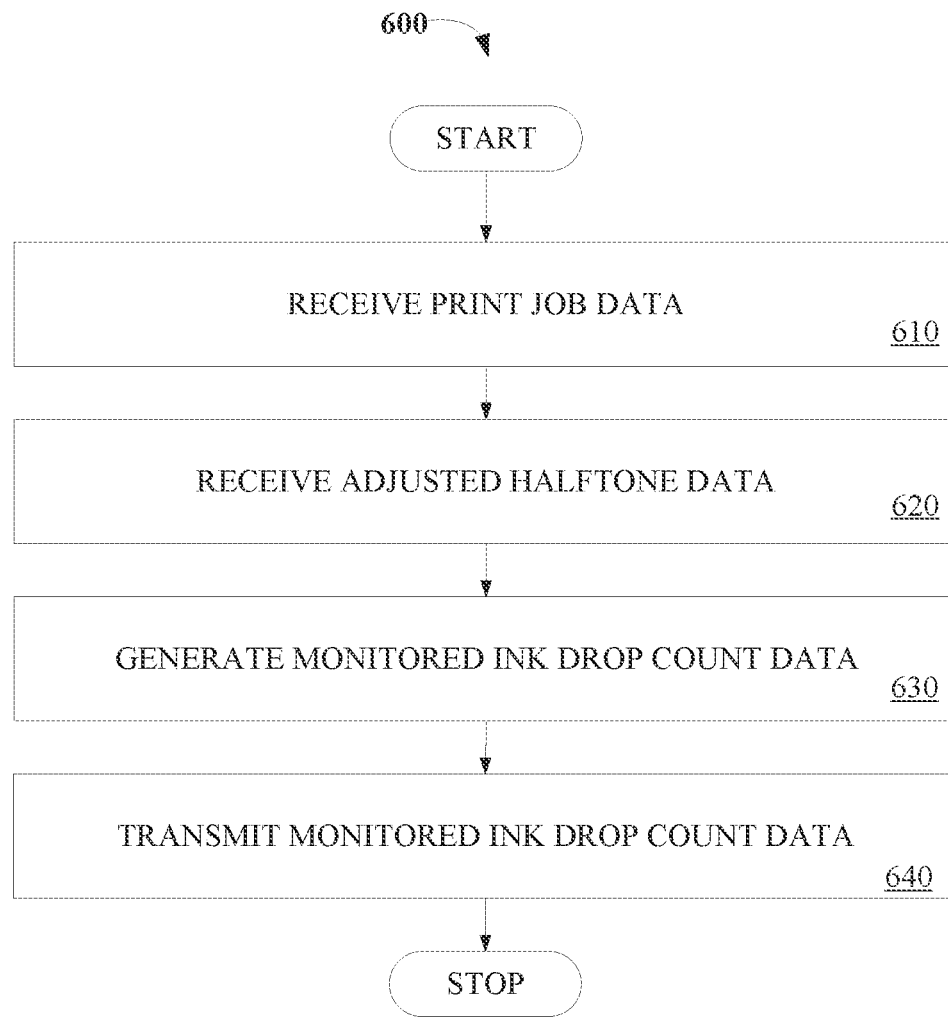
FIG. 6 is a flow diagram illustrating one embodiment for performing an ink monitoring process.

FIG. 6 is a flow diagram illustrating one embodiment of a process 600 for performing an ink monitoring process. Process 600 may be performed by processing logic that may include hardware (e.g., circuitry, dedicated logic, programmable logic, microcode, etc.), software such as instructions run on a processing device, or a combination thereof. In one embodiment, process 600 is performed by ink monitor 230.

At processing block 610, print job data 303 is received. At processing block 620, the adjusted halftone data 501 is received. At processing block 630, the monitored ink drop count data is generated based on the print job data and the adjusted halftone data. At processing block 640, the monitored ink drop count data is transmitted (e.g., to drop size monitor 240).

Due to the adjustments in the halftone design, the number of drops counted by drop count logic 510 are different from the number of drops that would have been printed on the same page using the original halftone design. Moreover, a drift in the printer 160 response may result in a change in the drop sizes used by ink estimation logic 220. Thus, the monitored ink drop size data are unknown. In another embodiment changes to drop counts occurs due to changes in halftone design and/or changes to a calibration Transfer Functions (TF). The impact of the calibration TF in this case will modify the job image data and consequently modify the ink drop count data. Therefore, the described method applies to systems employing calibrated halftones or halftones with transfer functions or calibrated halftones and transfer functions. The requirement is that the drop counts reflect the drop count impact of halftone design changes and transfer functions.

According to one embodiment, drop size monitor 240 (FIG. 2A and FIG. 2B) is implemented to determine monitored ink drop size data (e.g., current ink drop size data or second ink drop size data) after printing a job based on received estimated ink drop count data, monitored ink drop count data and initial drop size data. In such an embodiment, drop size monitor 240 receives the estimated ink drop count data, initial ink drop size data and the monitored ink drop count data for each of a plurality of color planes and determines monitored ink drop size data for each of the plurality of color planes based on the corresponding estimated ink drop count data, the initial ink drop size data and the monitored ink drop count data. In a further embodiment, the monitored ink drop size data may be transmitted. In yet a further embodiment, the monitored ink drop size data may be implemented to determine a total ink amount based on the estimated ink drop count data and ink drop size data by summing the ink amount for each page of the job. The total ink amount, determined by ink monitor and the total ink amount based on estimator, will be the same.

Drop size monitor 240 may also detect a difference between the initial ink drop size data and the monitored ink drop size data and determine whether the difference exceeds a predetermined threshold (e.g., a size difference threshold). In this embodiment, drop size monitor 240 may generate and transmit a message (e.g., alert, signal, action, etc.) upon determining that the difference between the initial ink drop size data and the monitored ink drop size data exceeds the predetermined threshold. In one embodiment, corresponding ink drop sizes are compared (e.g., small versus small, medium versus medium, large versus large, etc.) a message is generated if any comparison exceeds the threshold. In a further embodiment, the predetermined threshold may be selected via a graphical user interface (GUI) 250.

Figure 7:
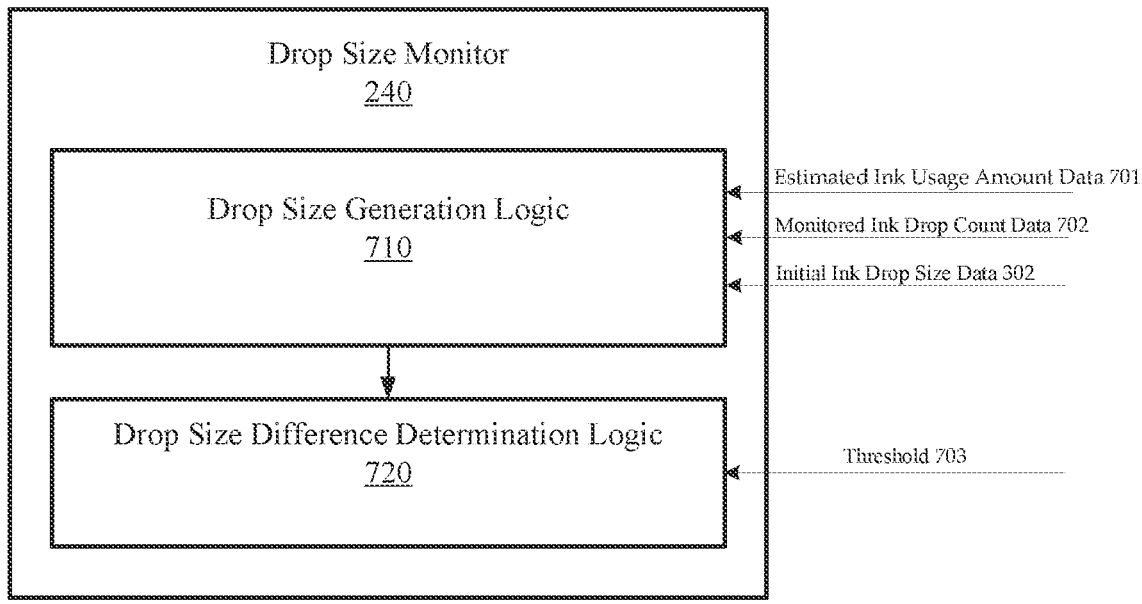
FIG. 7 illustrates one embodiment of drop size monitor.

FIG. 7 illustrates one embodiment of drop size monitor 240. As shown in FIG. 7, drop size monitor 240 includes drop size generation logic 710 that generates the monitored ink drop size data based on estimated ink usage amount data 701, initial ink drop size data 302 and monitored ink drop count data 702. In one embodiment, drop size generation logic 710 tracks changes to drop size as printer 160 operates. Since constant ink deposition (ink amount per unit area) in a calibrated printer is known to produce the same printed OD, and ink deposition for each region of interest (e.g., printed page, print head region or other region) is constant for the same printed job, drop size generation logic 710 may generate the monitored ink drop size data from the monitored ink drop count data, estimated ink drop count data and initial ink drop size data.

Also, since the estimated ink usage amount data is approximately equivalent to the monitored ink usage amount data for each page or print head or other region of the job, based on the matrix product of drop count matrix and drop size column vectors($Zv \approx Z^0 v^0$). As a result:

$\hat{v} = Z^\# Z^0 v^0$, where # is the pseudo-inverse operator, (e.g., $A^\# = (A^T A)^{-1} A^T$ for a rectangular matrix A), where $\hat{v}$ denotes the ink monitor drop size column vector v. This assumes that the same print job (or significantly the same print job) is processed by ink monitor and ink estimator to produce the ink data (e.g., ink drop count data, ink usage amount data, etc.) for each page.

Drop size monitor 240 also includes drop size difference determination logic 720 that determines a difference between the initial ink drop size data and the generated monitored ink drop size data. Drop size difference determination logic 720 may also determine whether the difference between the initial ink drop size data and the generated monitored ink drop size data is greater than a threshold 703. As discussed above, a message may be transmitted upon a determination that the difference between the initial ink drop size data and the generated monitored ink drop size data is greater than threshold 703.

Figure 8:
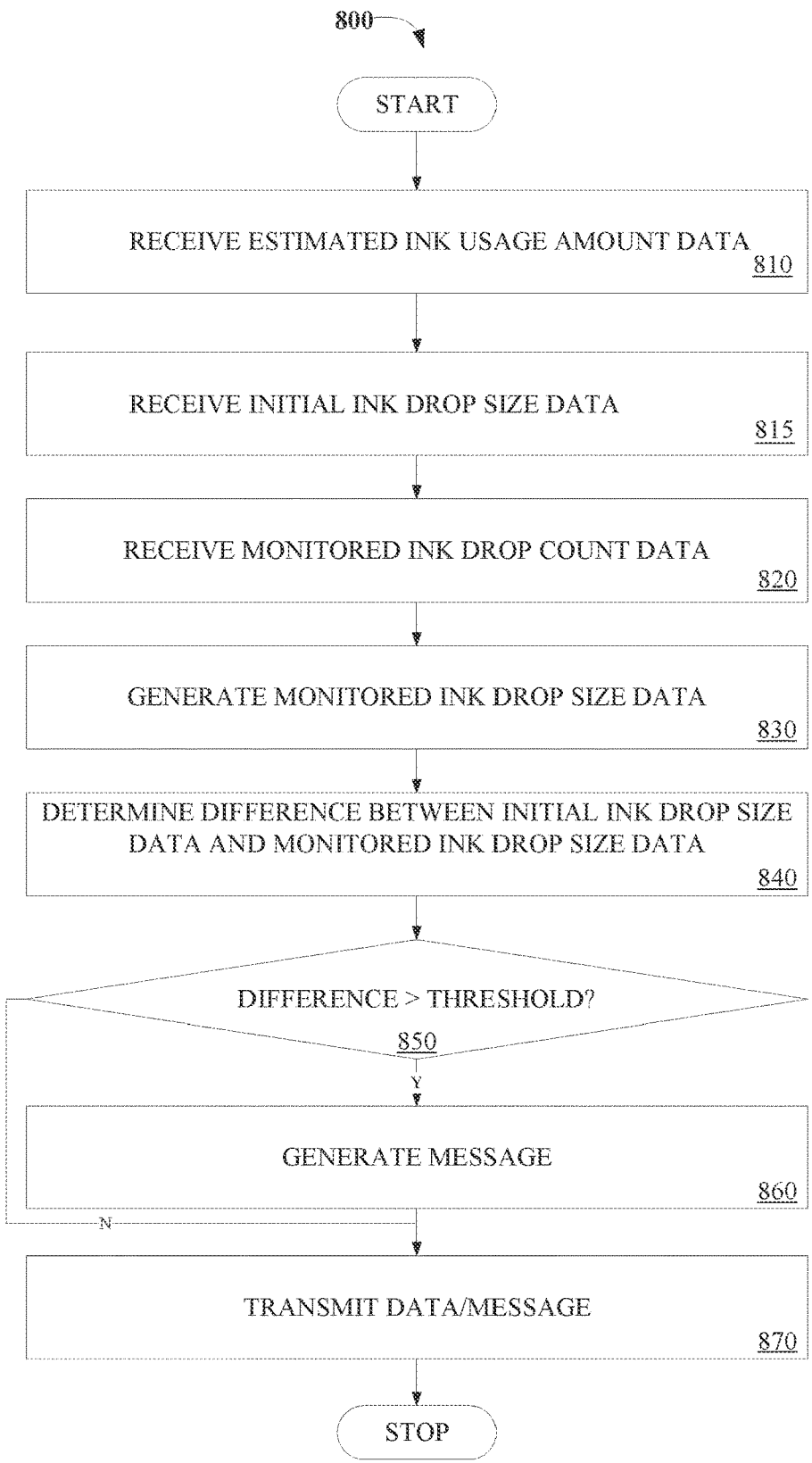
FIG. 8 is a flow diagram illustrating one embodiment for performing a drop size monitoring process.

FIG. 8 is a flow diagram illustrating one embodiment of a process 800 for performing a drop size monitoring process. Process 800 may be performed by processing logic that may include hardware (e.g., circuitry, dedicated logic, programmable logic, microcode, etc.), software such as instructions run on a processing device, or a combination thereof. In one embodiment, process 800 is performed by drop size monitor 240.

At processing block 810, estimated ink usage amount data is received. At processing block 815, initial ink drop size data is received. At processing block 820, monitored ink drop count data is received. At processing block 830, monitored ink drop size data is generated based on the estimated ink usage amount data and the monitored ink drop count data. At processing block 840, a difference is determined between the initial ink drop size data and the monitored ink drop size data.

At decision block 850, a determination is made as to whether the difference is between the initial ink drop size data and the monitored ink drop size data is greater than the threshold 803. If so, a message is generated (processing block 860) prior to transmitting the message (processing block 870). Otherwise, only the monitored ink drop size data is transmitted. Printer 160 may receive the message and in response perform corrective actions.

Figure 9:
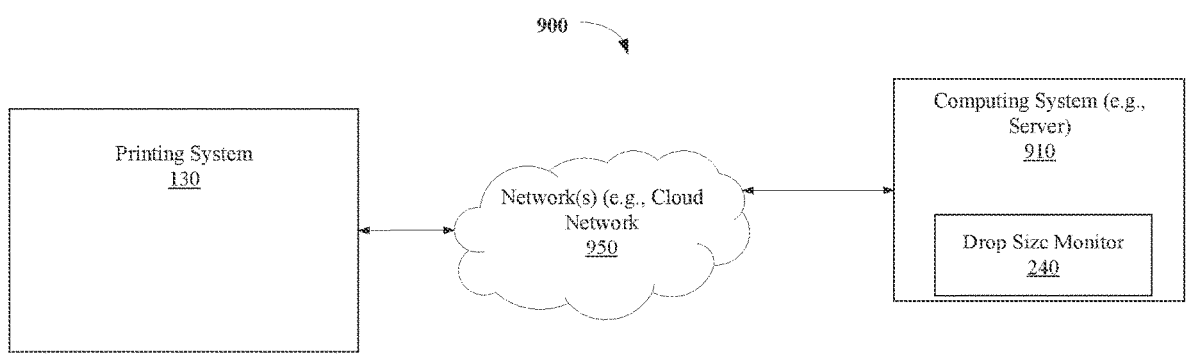
FIG. 9 illustrates one embodiment of a drop size monitor implemented in a network.

Although shown as a component of print controller 140, other embodiments may feature compensation module 216 included within an independent device, or combination of devices, communicably coupled to print controller 140. For instance, FIG. 9 illustrates one embodiment of a drop size monitor 240 implemented in a network 900. As shown in FIG. 9, compensation module 216 is included within a computing system 910 and transmits compensated halftones 220 and/or transfer functions to printing system 130 via a cloud network 950. Printing system 130 receives monitored ink drop size data and message(s).

Figure 10:
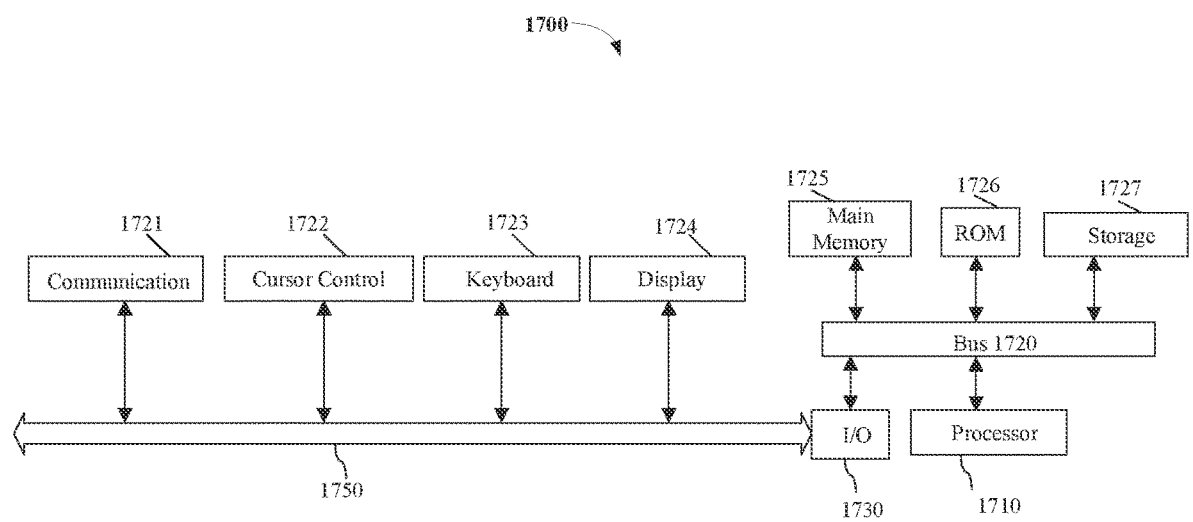
FIG. 10 illustrates one embodiment of a computer system.

FIG. 10 illustrates a computer system 1700 on which printing system 130 and/or compensation module 216 may be implemented. Computer system 1700 includes a system bus 1720 for communicating information, and a processor 1710 coupled to bus 1720 for processing information.

Computer system 1700 further comprises a random-access memory (RAM) or other dynamic storage device 1725 (referred to herein as main memory), coupled to bus 1720 for storing information and instructions to be executed by processor 1710. Main memory 1725 also may be used for storing temporary variables or other intermediate information during execution of instructions by processor 1710. Computer system 1700 also may include a read only memory (ROM) and or other static storage device 1726 coupled to bus 1720 for storing static information and instructions used by processor 1710.

A data storage device 1727 such as a magnetic disk or optical disc and its corresponding drive may also be coupled to computer system 1700 for storing information and instructions. Computer system 1700 can also be coupled to a second I/O bus 1750 via an I/O interface 1730. A plurality of I/O devices may be coupled to I/O bus 1750, including a display device 1724, an input device (e.g., an alphanumeric input device 1723 and or a cursor control device 1722). The communication device 1721 is for accessing other computers (servers or clients). The communication device 1721 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

Some embodiments pertain to Example 1 that includes a system comprising at least one physical memory device to store drop size logic and one or more processors coupled with the at least one physical memory device, to execute the drop size logic to receive first ink usage amount data for each of a plurality of color planes associated with a first halftone design and print job data, receive first ink drop size data for each of a plurality of color planes associated with the first halftone design, receive second ink drop count data for each of the plurality of color planes associated with a second halftone design and the print job data; and determine second ink drop size data for each of the plurality of color planes based on the corresponding first ink usage amount data, the first ink drop size data and the second ink drop count data.

Example 2 includes the subject matter of Example 1, wherein the drop size logic detects a difference between the first ink drop size data and the second ink drop size data, determines whether the difference between the first ink drop size data and the second ink drop size data exceeds a predetermined threshold and transmits a message upon determining that the difference between the first ink drop size data and the second ink drop size data exceeds the predetermined threshold.

Example 3 includes the subject matter of Examples 1 and 2, wherein the second ink drop size data is for a region of interest and determining the second ink drop size data for the region of interest is based on corresponding first ink usage amount data for the region of interest, first ink drop size data for the region of interest and second ink drop count data for the region of interest.

Example 4 includes the subject matter of Examples 1-3, wherein the region of interest is any one of the print job, a page of the print job, a printhead and a printhead array.

Example 5 includes the subject matter of Examples 1-4, wherein the memory device further to store ink estimation logic and the one or more processors to execute the ink estimation logic to generate the first ink usage amount data based on the print job data, the first halftone data and first ink drop size data.

Example 6 includes the subject matter of Examples 1-5, wherein the memory device further to store ink estimation logic and the one or more processors to execute the ink estimation logic to generate a first ink drop count data based on the print job data and the first halftone data; and generate the first ink usage amount data based on the first ink drop count data and the first ink drop size data.

Example 7 includes the subject matter of Examples 1-6, wherein the memory device further to store ink monitor logic and the one or more processors to execute the ink monitor logic to generate the second ink drop count data based on the print job data and second halftone data.

Example 8 includes the subject matter of Examples 1-7, wherein the second ink drop count data comprises an ink drop count matrix and the first ink drop size data comprises an ink drop size matrix.

Example 9 includes the subject matter of Examples 1-8, wherein the drop count matrix comprises elements associated with each of the plurality of instructed ink drop sizes.

Example 10 includes the subject matter of Examples 1-9, wherein each row of elements in the drop count matrix is associated with a different region of interest in the print job data.

Example 11 includes the subject matter of Examples 1-10, further comprising a printer to print the print job data.

Some embodiments pertain to Example 12 that includes a method comprising receiving first ink usage amount data for each of a plurality of color planes associated with a first halftone design and print job data, receiving first ink drop size data for each of a plurality of color planes associated with the first halftone design, receiving second ink drop count data for each of the plurality of color planes associated with a second halftone design and the print job data and determining second ink drop size data for each of the plurality of color planes based on the corresponding first ink usage amount data, the first ink drop size data and the second ink drop count data.

Example 13 includes the subject matter of Example 12, further comprising detecting a difference between the first ink drop size data and the second ink drop size data, determining whether the difference between the first ink drop size data and the second ink drop size data exceeds a predetermined threshold and transmitting a message upon determining that the difference between the first ink drop size data and the second ink drop size data exceeds the predetermined threshold.

Example 14 includes the subject matter of Examples 12 and 13, wherein the second ink drop size data is for a region of interest and determining the second ink drop size data for the region of interest is based on corresponding first ink usage amount data for the region of interest, first ink drop size data for the region of interest and second ink drop count data for the region of interest.

Example 15 includes the subject matter of Examples 12-14, wherein the region of interest is any one of the print job, a page of the print job, a printhead and a printhead array.

Example 16 includes the subject matter of Examples 12-15, further comprising generating the first ink usage amount data based on the print job data, the first halftone data and first ink drop size data, generating a first ink drop count data based on the print job data and the first halftone data and generating the first ink usage amount data based on the first ink drop count data and the first ink drop size data.

Some embodiments pertain to Example 17 that includes at least one computer readable medium having instructions stored thereon, which when executed by one or more processors, cause the processors to receive first ink usage amount data for each of a plurality of color planes associated with a first halftone design and print job data, receive first ink drop size data for each of a plurality of color planes associated with the first halftone design, receive second ink drop count data for each of the plurality of color planes associated with a second halftone design and the print job data; and determine second ink drop size data for each of the plurality of color planes based on the corresponding first ink usage amount data, the first ink drop size data and the second ink drop count data.

Example 18 includes the subject matter of Example 17, having instructions stored thereon, which when executed by one or more processors, further cause the processors to detect a difference between the first ink drop size data and the second ink drop size data, determine whether the difference between the first ink drop size data and the second ink drop size data exceeds a predetermined threshold and transmit a message upon determining that the difference between the first ink drop size data and the second ink drop size data exceeds the predetermined threshold.

Example 19 includes the subject matter of Examples 17 and 18, wherein the second ink drop size data is for a region of interest and determining the second ink drop size data for the region of interest is based on corresponding first ink usage amount data for the region of interest, first ink drop size data for the region of interest and second ink drop count data for the region of interest.

Example 20 includes the subject matter of Examples 17-19, wherein the region of interest is any one of the print job, a page of the print job, a printhead and a printhead array.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A system comprising:
   at least one physical memory device to store drop size logic; and
   one or more processors coupled with the at least one physical memory device, to execute the drop size logic to:
   receive first ink usage amount data for each of a plurality of color planes associated with a first halftone design and print job data;
   receive first ink drop size data for each of a plurality of color planes associated with the first halftone design;
   receive second ink drop count data for each of the plurality of color planes associated with a second halftone design and the print job data; and
   determine second ink drop size data for each of the plurality of color planes based on corresponding first ink usage amount data, the first ink drop size data and the second ink drop count data.

2. The system of claim 1, wherein the drop size logic detects a difference between the first ink drop size data and the second ink drop size data, determines whether the difference between the first ink drop size data and the second ink drop size data exceeds a predetermined threshold and transmits a message upon determining that the difference between the first ink drop size data and the second ink drop size data exceeds the predetermined threshold.

3. The system of claim 2, wherein the second ink drop size data is for a region of interest and determining the second ink drop size data for the region of interest is based on the corresponding first ink usage amount data for the region of interest, first ink drop size data for the region of interest and second ink drop count data for the region of interest.

4. The system of claim 3, wherein the region of interest is any one of the print job, a page of the print job, a printhead and a printhead array.

5. The system of claim 2, wherein the memory device further to store ink estimation logic and the one or more processors to execute the ink estimation logic to generate the first ink usage amount data based on the print job data, the first halftone data and first ink drop size data.

6. The system of claim 2, wherein the memory device further to store ink estimation logic and the one or more processors to execute the ink estimation logic to generate a first ink drop count data based on the print job data and the first halftone data; and generate the first ink usage amount data based on the first ink drop count data and the first ink drop size data.

7. The system of claim 5, wherein the memory device further to store ink monitor logic and the one or more processors to execute the ink monitor logic to generate the second ink drop count data based on the print job data and second halftone data.

8. The system of claim 1, wherein the second ink drop count data comprises an ink drop count matrix and the first ink drop size data comprises an ink drop size matrix.

9. The system of claim 8, wherein the drop count matrix comprises elements associated with each of a plurality of instructed ink drop sizes.

10. The system of claim 9, wherein each row of elements in the drop count matrix is associated with a different region of interest in the print job data.

11. The system of claim 5, further comprising a printer to print the print job data.

12. A method comprising:
    receiving first ink usage amount data for each of a plurality of color planes associated with a first halftone design and print job data;
    receiving first ink drop size data for each of a plurality of color planes associated with the first halftone design;
    receiving second ink drop count data for each of the plurality of color planes associated with a second halftone design and the print job data; and
    determining second ink drop size data for each of the plurality of color planes based on corresponding first ink usage amount data, the first ink drop size data and the second ink drop count data.

13. The method of claim 12, further comprising:
    detecting a difference between the first ink drop size data and the second ink drop size data;
    determining whether the difference between the first ink drop size data and the second ink drop size data exceeds a predetermined threshold; and
    transmitting a message upon determining that the difference between the first ink drop size data and the second ink drop size data exceeds the predetermined threshold.

14. The method of claim 13, wherein the second ink drop size data is for a region of interest and determining the second ink drop size data for the region of interest is based on corresponding first ink usage amount data for the region of interest, first ink drop size data for the region of interest and second ink drop count data for the region of interest.

15. The method of claim 14, wherein the region of interest is any one of the print job, a page of the print job, a printhead and a printhead array.

16. The method of claim 13, further comprising:
    generating the first ink usage amount data based on the print job data, the first halftone data and first ink drop size data;
    generating a first ink drop count data based on the print job data and the first halftone data; and
    generating the first ink usage amount data based on the first ink drop count data and the first ink drop size data.

17. At least one non-transitory computer readable medium having instructions stored thereon, which when executed by one or more processors, cause the processors to:

receive first ink usage amount data for each of a plurality of color planes associated with a first halftone design and print job data;

receive first ink drop size data for each of a plurality of color planes associated with the first halftone design;

receive second ink drop count data for each of the plurality of color planes associated with a second halftone design and the print job data; and determine second ink drop size data for each of the plurality of color planes based on corresponding first ink usage amount data, the first ink drop size data and the second ink drop count data.

18. The computer readable medium of claim 17, having instructions stored thereon, which when executed by one or more processors, further cause the processors to:

detect a difference between the first ink drop size data and the second ink drop size data;

determine whether the difference between the first ink drop size data and the second ink drop size data exceeds a predetermined threshold; and transmit a message upon determining that the difference between the first ink drop size data and the second ink drop size data exceeds the predetermined threshold.

19. The computer readable medium of claim 18, wherein the second ink drop size data is for a region of interest and determining the second ink drop size data for the region of interest is based on corresponding first ink usage amount data for the region of interest, first ink drop size data for the region of interest and second ink drop count data for the region of interest.

20. The computer readable medium of claim 19, wherein the region of interest is any one of the print job, a page of the print job, a printhead and a printhead array.

\* \* \* \* \*